United States Patent [19]
McLeod

[11] Patent Number: 5,569,996
[45] Date of Patent: Oct. 29, 1996

[54] METHOD AND APPARATUS FOR DISCHARGING BATTERIES

[76] Inventor: Terry J. McLeod, 259 Thrift St., Mobile, Ala. 36609

[21] Appl. No.: 278,608

[22] Filed: Jul. 21, 1994

[51] Int. Cl.⁶ .................................................. H01M 10/44
[52] U.S. Cl. ................................................ 320/2; 320/13
[58] Field of Search ......................... 320/13, 2; 361/792, 361/794

[56] References Cited

U.S. PATENT DOCUMENTS

| | | | |
|---|---|---|---|
| 3,603,861 | 9/1971 | Staats et al. | 320/14 |
| 4,609,860 | 9/1986 | Fasen | 320/14 |
| 4,698,579 | 10/1987 | Richter et al. | 320/14 |
| 5,185,564 | 2/1993 | Miller | 320/2 |

Primary Examiner—Peter S. Wong
Assistant Examiner—Patrick Law
Attorney, Agent, or Firm—George L. Williamson

[57] ABSTRACT

An improved battery discharge device is provided having a non-conducting base member including a first solid conducting plate also having a second conducting plate having holes therein with a first insulating member or air space between the first and second conducting plates. Holes are provided in the first insulating plate and the second conducting plate so that pegs can be pushed through the holes to allow contact between the battery terminals and the first solid conducting plate so as to allow a current to flow between the terminals of the battery and thereby discharge the batteries. Also, an illuminator is provided so as to indicate the flow of current from the first solid conducting plate to the second conducting plate. Other embodiments showing various connectors for specialized batteries are also provided.

2 Claims, 3 Drawing Sheets

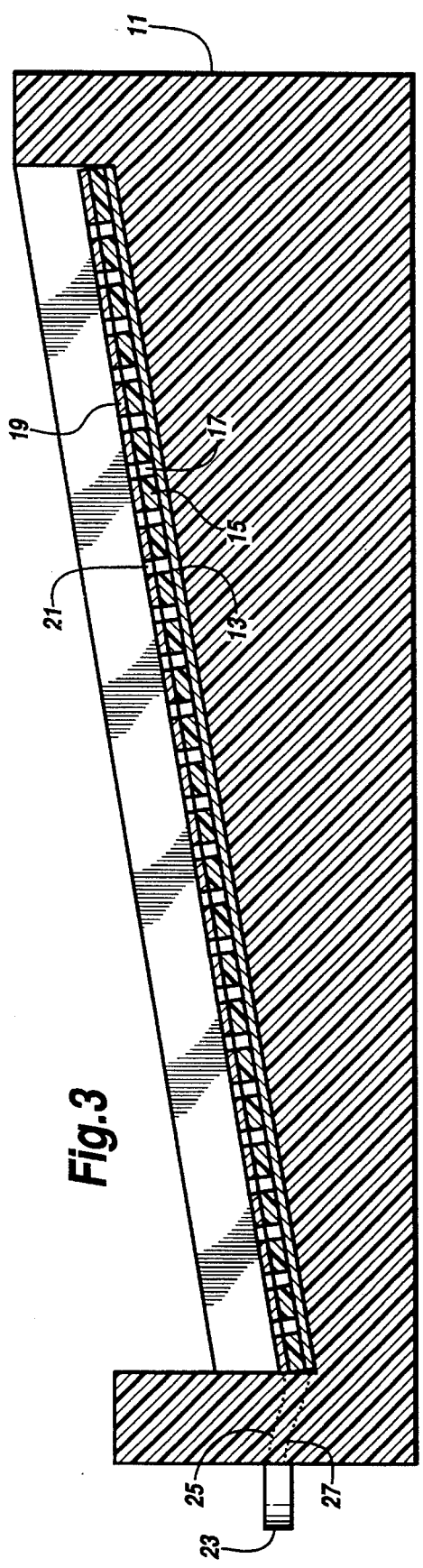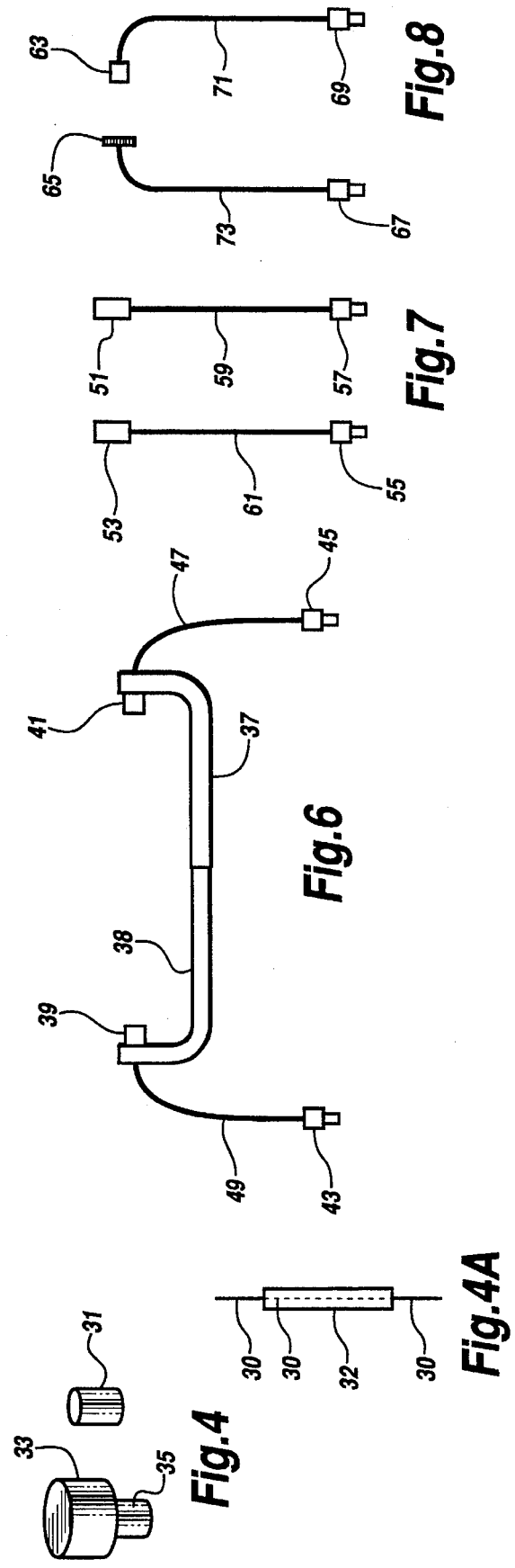

METHOD AND APPARATUS FOR DISCHARGING BATTERIES

BACKGROUND OF THE INVENTION

This invention generally relates to devices for discharging batteries. More particularly, this invention relates to devices for discharging rechargeable batteries in an efficient, safe and economical manner. Because of the increased use of portable devices, e.g., telephones, video recorders, handheld radios, etc., it has become necessary to have a device for fully discharging batteries which have a memory. Otherwise, a subsequent charge cannot be fully accomplished. Attempts have been previously made to provide battery discharge devices. Miller, in U.S. Pat. No. 5,185,564, described a discharge apparatus for the continuous discharge of appliance batteries, including a central housing formed with adjustable contact members to effect electrical communication with a battery and associated discharge components. It also included a strap-like structure for mounting the housing to the battery. Richter, et al., in U.S. Pat. No. 4,698,579, described a charger for a battery-operated surgical machine, including a charging circuit and a housing. The housing contained the charging circuit and was provided with a plugged receptacle means for the battery component of the surgical machine. The housing was also fitted with a selector switch connected to the charging circuit. In a first position, the charging circuit charged the battery immediately, while in a second position the charging circuit first discharged the battery down to a predetermined lower potential and thereafter charged it up to a predetermined higher potential. Fasen, in U.S. Pat. No. 4,609,860, described a battery charger for recharging nickel cadmium batteries, including a trickle charge, fast charge and deep charge modes. A control circuit included a clock-driven mode control counter having counter states which conditioned power supply circuitry within the charger to the mode appropriate to the battery terminal voltage. The counter was conditioned to its deep discharge state by actuation of a user accessible switch. When the terminal voltage fell below a first predetermined level, the counter automatically reverted from the discharge state to its fast charge state to establish the fast charge mode. When the terminal voltage rose above a second predetermined level, the counter automatically reverted to its trickle charge state to establish the trickle charge mode. Staats, in U.S. Pat. No. 3,603,861, described a battery charger for rapidly recharging small capacity rechargeable batteries. The batteries being recharged are placed in electrical contact with terminals that are electrically coupled to a source of DC current, a current being completed through the battery or batteries to be recharged. The charger included a spring-driven rotary switch that contacted a discharge terminal and then a charge terminal, the battery thereby being first discharged for a predetermined period of time and then charged for a predetermined period of time. However, none of the prior art includes the unique and novel features of the present invention.

SUMMARY OF INVENTION

The present invention provides for a versatile discharging apparatus comprising a plastic, non-conducting base for holding a first solid electrical conducting plate, for example, made of aluminum or like material, on top of which is placed a non-conducting plate of plastic or like material having holes therein. A second conducting plate made of aluminum or like material having holes therein for insertion of pins or electrical contacts, or the like, which pins make contacts with the battery terminals is placed on top of the non-conducting plate. Due to the fact that the plastic, non-conducting plate and the second conducting plate has multiple holes therein, the electrical contacts or pins can be moved about and placed in the proper position to accommodate batteries of different size and shape. Furthermore, it is possible to discharge multiple batteries simultaneously.

It is an object of the present invention to provide a method and apparatus for discharging storage batteries in a safe and efficient manner. It is a further object of the present invention to provide a method and apparatus for discharging batteries that will accommodate many, differently sized nickel cadmium batteries of various voltages and shapes. It is also an object of the present invention to provide a device which will discharge several differently sized batteries simultaneously, which batteries may be of different voltages. Further, it is an objective of the present invention to be portable and not require an outside power source for operation.

BRIEF DESCRIPTION OF THE DRAWINGS

FIG. 3 is a cross-sectional elevation view of the present invention taken along line A—A of FIG. 2.

FIG. 4 is a perspective view of alternative parts of the present invention.

FIG. 4A is a plan view of one embodiment of the present invention.

FIG. 6 is a plan view of one embodiment of the present invention.

FIG. 7 is a plan view of one embodiment of the present invention.

FIG. 8 is a plan view of one embodiment of the present invention.

DETAILED DESCRIPTION OF THE PREFERRED EMBODIMENT(S)

Figure 1:
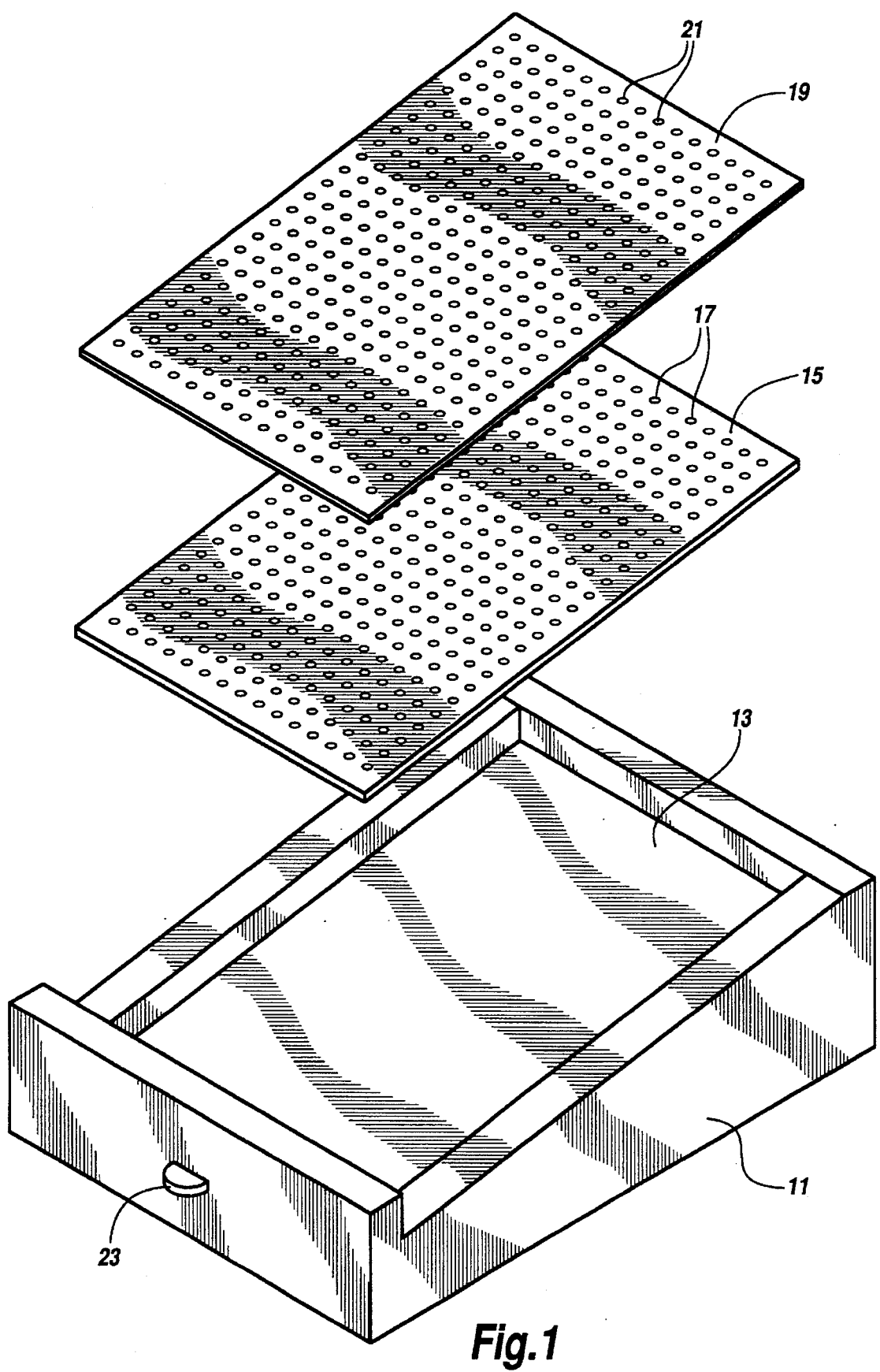
FIG. 1 is a perspective of the present invention.
Figure 2:
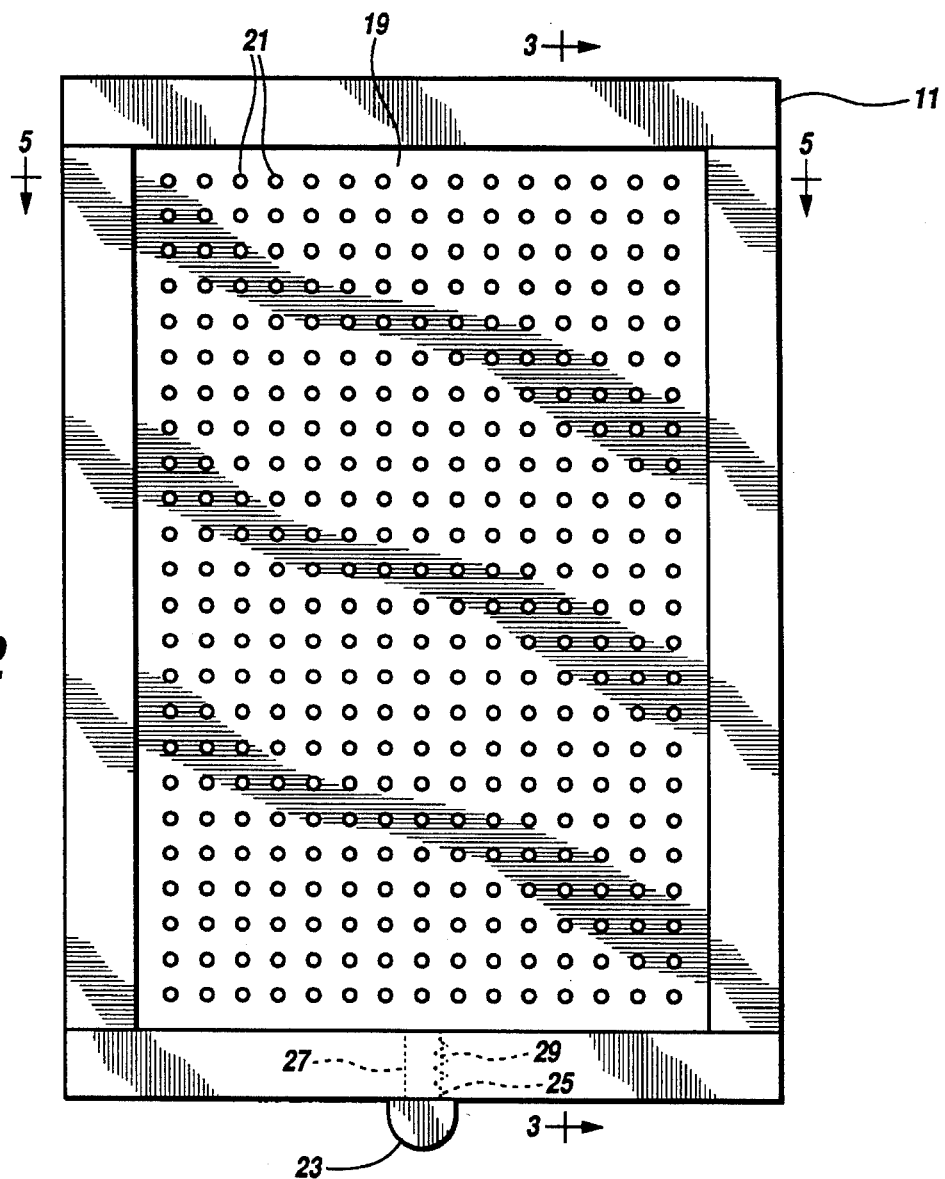
FIG. 2 is a plan view of the present invention.

Turning to FIG. 1, therein is shown the non-conducting base of the present invention, 11, having mounted thereon a first solid electrically-conducting plate, 13, made of a conducting metal such as aluminum or like material. Shown therein is a first non-conducting plate, 15, having holes therein, 17, which plate is made of non-conducting material, such as plastic or like material. Shown therein is a second electrically-conducting plate, 19, having holes therein, 21. Also shown is an illuminator device, 23, which is electrically connected by means to the plate, 13, and the plate, 19, which could be a DC light or an LCD or like device which would indicate that a current was flowing through or between the base plate, 13, and the plate, 19. The illustrative electrical connections from the illuminator, 23, to the solid plate, 13, and the plate, 19, are shown in FIG. 2. Note that an alternative embodiment of the present invention can be constructed to eliminate plate, 15, by using non-conducting approximate ⅛ inch to ¼ inch risers or spacers made of rubber or like material located at the four corners of and between the plates, 13, and, 19. This would then cause a non-conducting air space of about ⅛ inch thickness to exist between the surfaces of plates, 13, and, 19. Turning to FIG. 2, therein is shown a plan view of the base of the device, 11, showing the second conducting plate, 19, having holes therein, 21. Also shown therein is the illuminator, 23. Also shown as hidden lines are the electrical contacts from the illuminator, 23, to the solid conducting base plate, 13, and the plate, 19, which hidden lines are shown as 27 and 25. Also shown in the circuit between the illuminator and the base plate is an alternative load resistor, 29, which may be used. Turning to FIG. 3, which is taken along a section line A—A of FIG. 2, therein is shown the base, 11, the solid conducting plate, 13, the first insulating plate, 15, having holes therein, 17. Also shown is the second conducting plate, 19, having holes therein, 21. Also shown is the illuminator, 23, with electrical connections, 25 and 27, to plates, 13, and, 19. Turning to FIG. 4, therein is shown alternative electrical conducting pins, jacks, pegs, plugs or contactors at 31, which contactor is made of approximately the same diameter as the holes 17 and 21 so as to be inserted and held firmly into said holes. Also shown in FIG. 4 is a different embodiment of a contactor, 33, having a pin 35 for insertion into the holes of the plates shown at 17 and 21. These contactors, one for each battery terminal, make contact and electrical connection between the positive and negative terminals of the battery and the solid conducting plate, 13 and plate, 19. It should be obvious that the batteries will discharge through the illuminator, 23, or load resistor, 29, after the contactors are connected to each battery terminal and to the solid plate, 13 and plate, 19. Note that the tip of only one of the two contactors, e.g., 33, makes contact between plate 13 and one of the two battery terminals while the other contactor makes connection between plate 19 and the other battery terminal. This is accomplished by insulating a portion of one contactor. Otherwise, a short circuit would occur across the battery terminals. See FIG. 4A for further explanation.

Turning to FIG. 4A, therein is another exemplary contactor, peg, jack or plug, 30, with a portion of the peg, 30, being covered by insulation, 32. The purpose of the insulation, 32, is to allow the peg, 30, to pass through the plate, 19, without making electrical contact with plate, 19, while making an electrical connection between one of the two battery terminals and plate 13. Otherwise a short circuit would occur across the battery terminals. By having a non-conducting or insulated portion, 32, of the peg, 30, it is assured that a short circuit is avoided. Therefore, in operation, one of the two required pegs will always have an insulated portion, e.g., 32, while the other peg will be uninsulated, e.g., 31, and make electrical contact between one battery terminal and plate, 19. Only the portion of the contactor, 30, which would otherwise be in electrical contact with plate, 19, is insulated.

Figure 5:
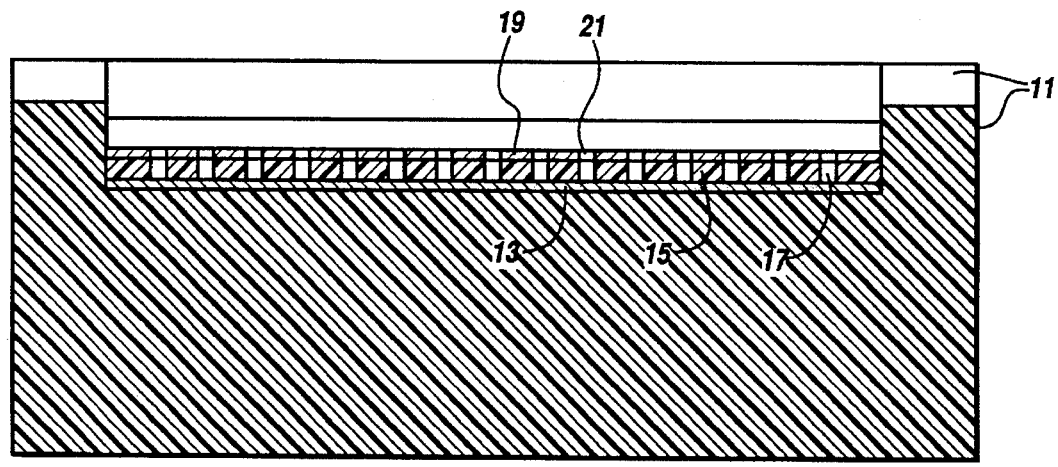
FIG. 5 is a cross-sectional elevation view of the present invention taken along line B—B of FIG. 2.

Turning to FIG. 5, therein is shown the base, 11. Also shown therein is the first conducting plate, 13, the first insulating plate, 15, having holes therein, 17, and the second conducting plate, 19, having holes therein, 21. FIG. 5 is taken along section line B—B of FIG. 2.

Turning to FIG. 6, therein is shown an alternative embodiment of contactor for specialty batteries having specialized electrical terminals of special size and shape for connecting said batteries to the present invention. Therein is shown the female adapter frame, 37, and the male portion of the adapter frame, 38, having two electrical contacts, 39 and 41, for contacting the positive and negative electrical contacts of the batteries. Note that the adapter frames 37 and 38 are slidably connected so that the unit is expandable to fit different sizes of batteries. Alternatively, frames 37 and 38 could be manufactured as a solid, non-expandable unit if desirable. Also shown therein are the pins, pegs or plugs, 43 and 45, for plugging into the boards, i.e., holes 17 and 21 so as to contact plate, 13, and plate, 19, of the present invention having flexible cables, 47 and 49, for connecting the pins to the basic contactor frame, 39 and 41. These alternative contactors could be made of a fixed size and shape to accommodate a certain make and model battery or be expandable to fit many battery types.

Turning to FIG. 7, therein is shown another embodiment for connecting specialty batteries to the present invention. Therein are shown the contactors for connection to the batteries' electrical contactors at 51 and 53. Note that these would be made of magnetic material so as to easily contact to the batteries' two electrical terminals. Also shown therein are the pin plugs, 55 and 57, for connection to the present invention. The pin plugs, 55 and 57, are connected to the electrical contacts, 51 and 53, through flexible electrical cables, 59 and 61.

Turning to FIG. 8, there is shown another embodiment for connecting different type batteries to the present invention. Therein is shown contactors, 63 and 65, one being a male plug, 63, and the other being a female plug, contractor or jack, 65, for connection to commonly available 9-volt batteries. Also, shown are pin plugs, 67 and 69, for connection between the plates of the present invention being connected to the contactors, 63 and 65, through the flexible cables, 71 and 73.

In operation, for example, the pins 31 or 33 are placed into and through the holes 17 and 21 so that only one of them would be in electrical contact with plate 13 said pins being placed to be of the same width as the two terminals of the particular battery. The terminals of the battery are then placed against and in electrical contact with the pins 31 or 33. These pins would be placed toward the lower sloped end of the base, 11, so that gravity would keep the battery in contact with the pins. The battery would then discharge completely as it lay on plate 19 because current would flow through the illuminator, 23, between and through plates, 13, and, 19.

In operation, alternative adapter frame, 37, and, 38, of FIG. 6 would be snapped onto or connected to the two terminals of the battery to be discharged and then each of plugs 43 and 45 would be inserted through holes 17 and 21 so that one of them made electrical contact with plate 13 so that the battery would become discharged. Likewise, alternative battery contactors 51 and 53 or 63 and 65 of FIGS. 7 and 8 would be connected to each battery terminal and plugs 55 and 57 or 67 and 69 inserted through holes 17 and 21 to have only one electrically contact plate 13 so as to discharge the battery.

From the foregoing teachings, it is clear that the invention can be economically manufactured of various materials so as to provide a convenient and easily usable improved battery discharger. Furthermore, the foregoing teachings show that the invention can be manufactured of many types of material including metals, plastics or like materials.

The teachings of this specification are meant to be illustrative and explanatory thereof and various changes in the size, and shape and material, as well as in the illustrative construction of the preferred embodiments can be made without departing from the spirit of the present invention. Many other embodiments of the invention could be easily manufactured by simply modifying the invention as herein and above described and shown in the attached drawings and following claims.

I claim:

1. An apparatus for discharging batteries comprising:

(a) a mounting base of non-conducting material;

(b) said mounting base having mounted thereon a first solid conducting plate for conducting electricity;

(c) a non-conducting plate having holes therein of non-conducting material mounted contiguous to said first conducting plate;

(d) a second conducting plate having holes therein mounted contiguous to said non-conducting plate;

(e) means for electrically connecting a battery to said first and second conducting plate; and (f) an illuminator for indicating the flow of electricity through said first and second conducting plate wherein the illuminator is electrically connected to said first and second conducting plate for completely discharging the battery.

2. A method for discharging batteries comprising the steps of:

(a) providing a mounting base of non-conducting material;

(b) having a first solid conducting plate mounted on said mounting base;

(c) providing a non-conducting plate having holes therein mounted contiguous to said first conducting plate;

(d) Providing a second conducting plate having holes therein mounted contiguous to said non-conducting plate;

(e) electrically connecting a battery to said first and second conducting plate; and (f) providing an illuminator for indicating the flow of electricity through first and second conducting plate wherein the illuminator is connected to said first and second conducting plate for completely discharging the battery.

* * * * *